Feb. 19, 1963          J. E. REED          3,077,842
METHOD AND APPARATUS FOR TREATING SEWAGE
Filed Sept. 12, 1960          7 Sheets-Sheet 1

INVENTOR.
JOSEPH E. REED
BY
Schmieding and Fultz
ATTORNEYS

Feb. 19, 1963   J. E. REED   3,077,842
METHOD AND APPARATUS FOR TREATING SEWAGE
Filed Sept. 12, 1960   7 Sheets-Sheet 4

INVENTOR.
JOSEPH E. REED
BY
*Schmieding and Fultz*
ATTORNEYS

Feb. 19, 1963    J. E. REED    3,077,842
METHOD AND APPARATUS FOR TREATING SEWAGE
Filed Sept. 12, 1960    7 Sheets-Sheet 5

*INVENTOR.*
JOSEPH E. REED
BY
*Schmieding and Fultz*
ATTORNEYS

INVENTOR.
JOSEPH E. REED
BY
Schmieding and Fultz
ATTORNEYS

Feb. 19, 1963 J. E. REED 3,077,842
METHOD AND APPARATUS FOR TREATING SEWAGE
Filed Sept. 12, 1960 7 Sheets-Sheet 7

INVENTOR.
JOSEPH E. REED
BY
Schmieding and Fultz
ATTORNEYS.

United States Patent Office 3,077,842
Patented Feb. 19, 1963

3,077,842
METHOD AND APPARATUS FOR
TREATING SEWAGE
Joseph E. Reed, 50 Walnut St., Shelby, Ohio
Filed Sept. 12, 1960, Ser. No. 56,334
19 Claims. (Cl. 110—8)

This invention relates to treatment of sewage and particularly to a novel method and apparatus for removing grease and foam therefrom.

This application is a continuation-in-part of my co-pending application Serial Number 15,671, filed March 17, 1960, which is now abandoned.

In municipal sewage treatment plants it is common practice to introduce sewage into pre-aeration and aeration tanks wherein air is released into the bath of sewage. In the course of the aeration process grease and foam present in the sewage accumulate on the surface of the bath and form a scum.

The grease present in the scum has presented a problem in that it has been necessary to collect it in pits and subsequently pump it into tanks so that it can be hauled away.

Foam present on the scum also presents a problem in that some of it passes through the sewage plant and is discharged into streams and rivers. Also some of the foam is often blown away by the wind and carried for considerable distances so as to become a public nuisance.

It should be pointed out that foam is a particular problem in sewage plants following normal laundry days, since the detergents used in the many homes throughout the area work their way through the sewers to the sewage plant and hence arrive in the aeration tanks in considerable volume as compared to other times of the week.

It should also be pointed out that the amount of foam will vary according to the density of the sewage with a maximum amount being present during warm, dry weather and a minimum amount being present during rainy weather when the sewage is diluted with surface water.

In accordance with the present invention a flow of air or other suitable gas is introduced into the lower depths of the bath of sewage in the aeration tank, along one side thereof. The upwardly progressing air creates foam on the surface of the bath and induces circulation within the bath which causes the particles of grease entrained in the sewage to move to the surface of the bath and flow across the surface of the bath towards one side of the tank.

In accordance with one aspect of the present invention a battery of burners are mounted along the side of the tank so as to direct their flames into a firing zone and against particles of grease and foam that are continuously progressing across the surface of the bath and into the firing zone wherein these substances are ignited.

As another aspect of the present invention a metal tray and collector pipe assembly is submerged just below the surface of the bath and serves to hydraulically induce surface scum to progress towards a firing zone.

In accordance with another aspect of the present invention a novel tray firing plate and burner assembly is arranged to skim greasy scum from a surface flow of sewage which is caused to converge to a firing zone where the scum is burned.

It is therefore an object of the present invention to provide a novel method and apparatus that make it possible for sewage treatment plants to prevent grease and foam from passing into the waterway into which the effluent from the plant is released.

It is still another object of the present invention to provide a novel method and apparatus which collects and burns concentrations of foam, caused by the excessive amount of detergents in the sewage treatment tanks, and thereby eliminates the foam and prevents it from being spread about the adjacent area by the wind.

It is another object of the present invention to provide a novel method and apparatus for efficiently and economically disposing of grease and foam encountered in sewage treatment operations.

Further objects and advantages of the present invention will be apparent from the following description, deference being had to the accompanying drawings wherein preferred forms of embodiments of the invention are clearly shown.

Figure 1:
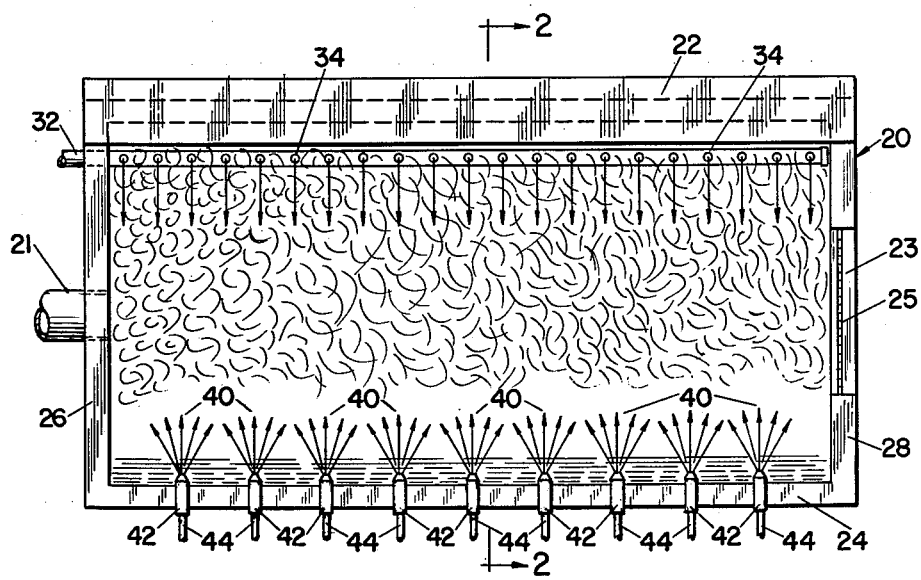
FIG. 1 is a plan view of a sewage treatment tank constructed in accordance with one aspect of the present invention.
Figure 2:
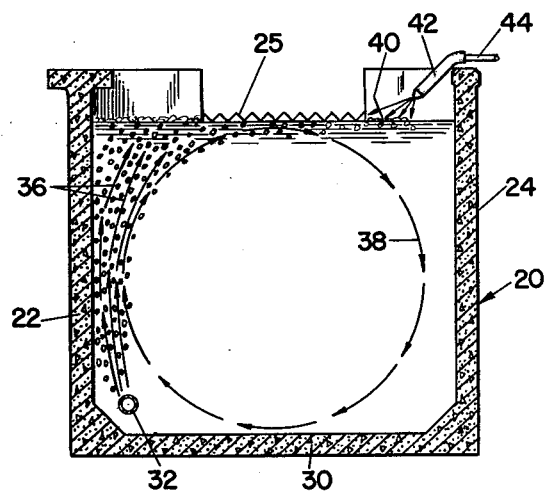
FIG. 2 is an end sectional view of the tank and apparatus of FIG. 1, the section being taken along the line 2—2 of FIG. 1.

Referring in detail to the drawings, FIGS. 1 and 2 illustrate a tank indicated generally at 20 that includes side walls 22 and 24, end walls 26 and 28, and a bottom wall 30.

Sewage is introduced into tank 20 through an intake conduit 21 that passes through a hole in end wall 26. After undergoing circulation, as later to be described, sewage is released from the topmost strata at a wier 23 formed in end wall 28. A metal plate 25 having a saw-toothed upper edge forms the crest of weir 23.

A conduit 32 receives a flow of air or other gas from a suitable source, not illustrated, and releases said air through a plurality of longitudinally spaced outlets 34.

With reference to FIG. 2 the air released from the outlets of conduit 32 rises along the inner surface of the wall 22 as is indicated by a plurality of flow arrows 36.

Such release of air serves to aerate the sewage and also induces a generally circular path of circulation within the tank, as indicated by the arrow pattern 38, which in turn produces a flow across the surface of the bath to a firing zone 40. The surface flow across the surface of the bath occurs in what will be termed herein as the surface level zone of the tank 20. This surface level zone is established in the embodiment of FIGS. 1-3 by the crest of weir 23. This surface level zone could be established, however, by other means without departing from the spirit of the present invention.

A plurality of burners 42 are mounted along the upper edge of side wall 24 and include gaseous fuel intake conduits 44, said conduits being connected to a source of gaseous fuel not illustrated.

In operation of the device of FIG. 1, a flow of sewage is continuously introduced at intake pipe 21 and released at weir 23. A flow of air from aeration conduit 32 induces a circulation pattern as is indicated by the arrows 38. This causes the surface strata of the bath which carries grease and foam to progress towards and into an elongated firing zone produced by the battery of burners 42. By continuous circulation into and through the firing zone the grease and scum are effectively burned and thereby removed from the sewage.

Reference is next made to FIGS. 3-8 which illustrate a modification of the present invention that includes a sewage treatment tank indicated generally at 50 that includes side walls 52 and 54, end walls 56 and 58, a sewage intake conduit 60 and a sewage discharge weir 62.

Figure 4:
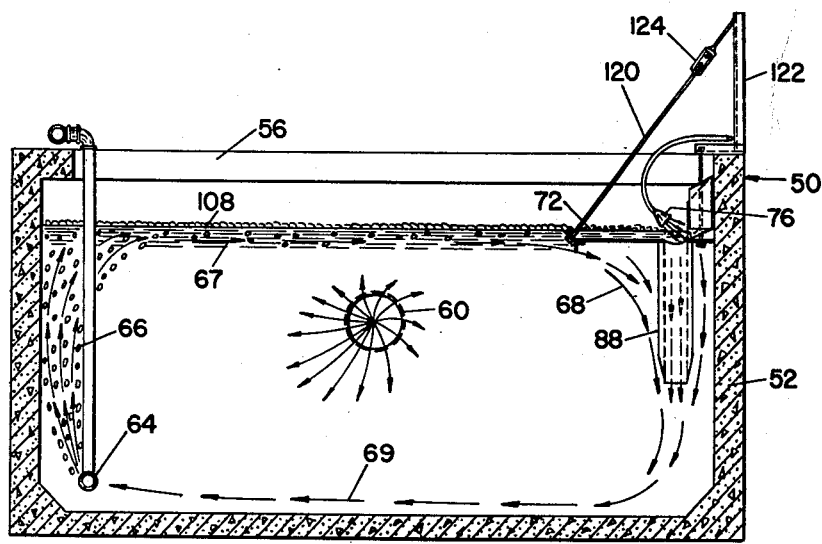
FIG. 4 is an end sectional view of the tank and apparatus of FIG. 3, the section being taken along the line 4—4 of FIG. 3.

Air is released into a bath through an aeration conduit 64 such that the rising air induces a circulation pattern as indicated by the arrows 66—69 in FIG. 4. The arrows 67 diagrammatically illustrate a surface flow of topmost strata which flow carries particles of grease and foam across the surface of the bath and into the tray means indicated generally at 70, 72, and 74.

Each of the trays includes a burner 76 connected with a fuel supply conduit 78.

Figure 5:
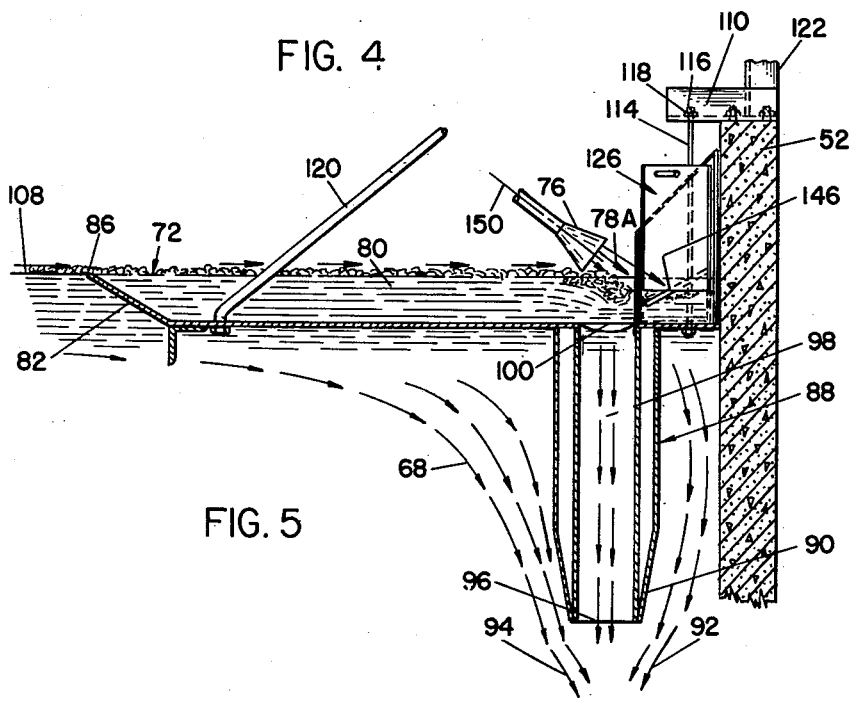
FIG. 5 is a partial sectional view of the tank of FIGS. 3 and 4 which view constitutes an enlarged showing of the apparatus installed in the tank.

As is best seen in FIG. 5 each of the burners 76 directs its flame at a downwardly inclined angle towards a firing zone 78A such that the force of the flame helps to draw the foam and grease into the firing zone.

Each of the trays 70, 72, and 74 includes upturned peripheral flanges 80, 82, and 84, the upper edges 86 of which are located just below the surface 108 of the bath.

An aspirator or collector pipe indicated generally at 88 is mounted to tray 72 and converges inwardly at its lower end 90 to cause the downward circulation flow 68 to converge as indicated by arrows 92 and 94 in FIG. 5. This creates a low pressure zone or suction at the outlet 96 of collector pipe 88 which accelerates the downward flow through the interior 98 of collector pipe 88.

In order to supply the increased downward flow volume demanded by the increased velocity through collector pipe 88 the surface strata is necessarily accelerated towards and into the entrance 100 of collector pipe 88. Hence surface strata will be drawn inwardly over end flange 82 and side flanges 80 and 84 of tray 72.

Figure 3:
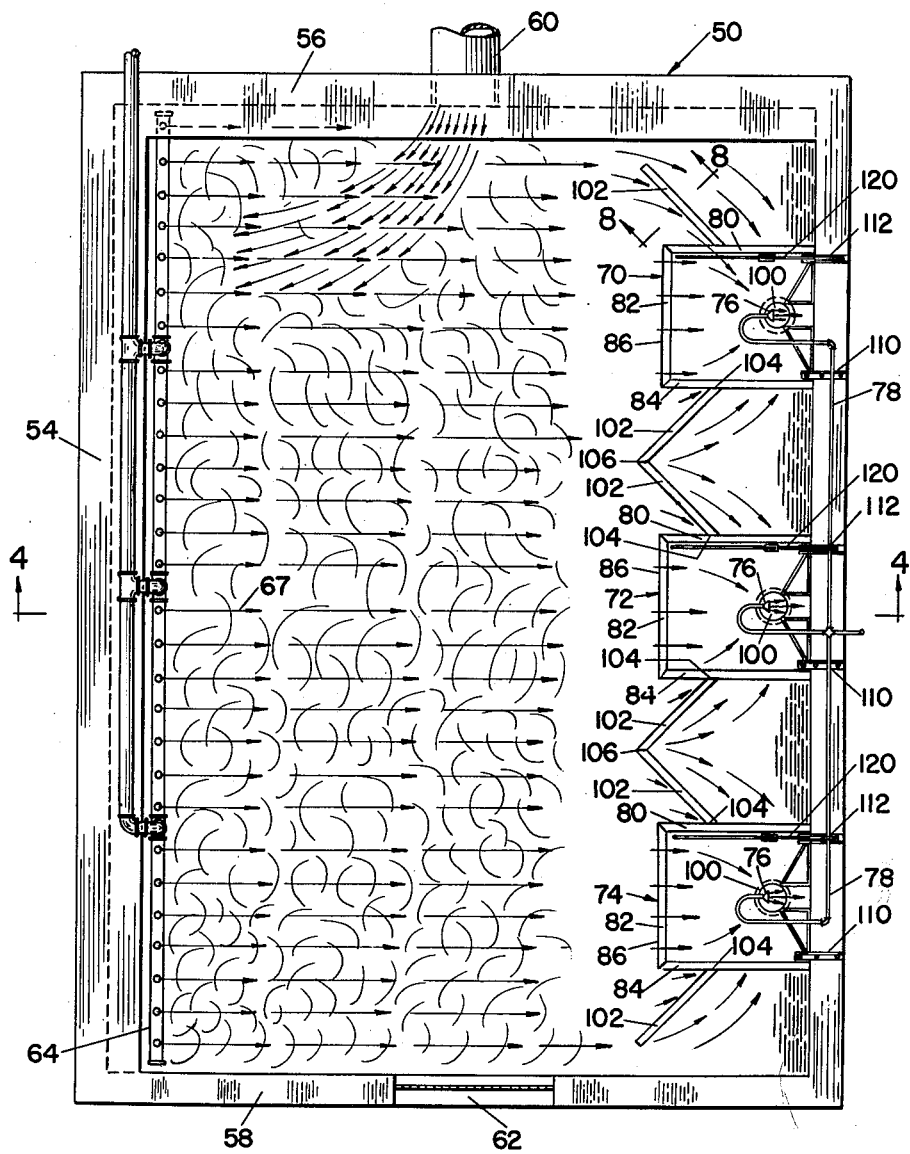
FIG. 3 is a plan view of a sewage treatment plant constructed in accordance with another aspect of the present invention.

As best seen in FIG. 3 a plurality of guides 102 are secured to the sides of the tray at 104 and extend outwardly to junctions 106. These guides help direct the grease and foam towards and into the firing zones 78A.

Since the surface level 108 of the bath, FIGS. 4 and 5, may vary somewhat depending upon the volumetric flow of sewage passing through the tank, it is desirable to provide an adjustable mounting means for the tray whereby the upper edge 86 of tray 72 can be varied so as to lie just below the surface 108 of the bath. To provide such vertical adjustment the rear edge of tray 72 is suspended from angle iron brackets 110 and 112 by means of rods 114 provided with threaded upper ends 116. The effective lengths of the rods are varied by adjusting nuts 118 that are carried on the upper threaded ends 116 of rods 114 in overlying relationship with the outer end of brackets 110 and 112.

The outer edge of tray 72 is adjustable supported by a brace rod 120 that extends between said outer edge and an upright support 122. The effective length of rod 120 is adjusted by means of a turnbuckle 124.

Figure 6:
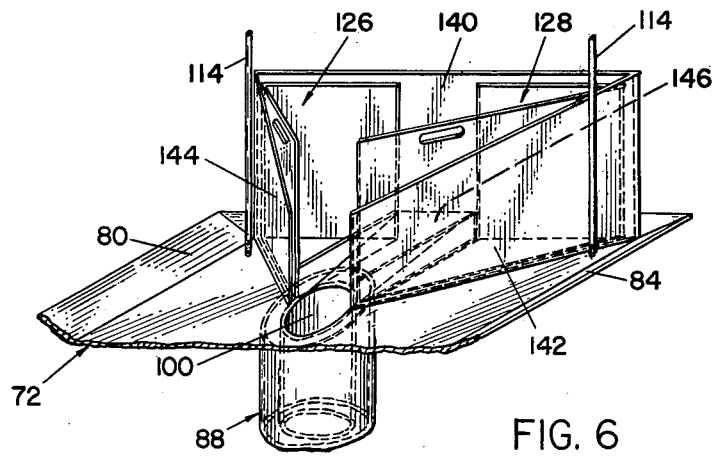
FIG. 6 is a partial perspective view of a foam and grease apparatus installed in the tank of FIG. 3.
Figure 8:
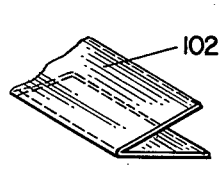
FIG. 8 is a partial perspective view of a baffle comprising a portion of the apparatus of FIGS. 3–7, the section being taken along the line 8—8 of FIG. 3.
Figure 7:
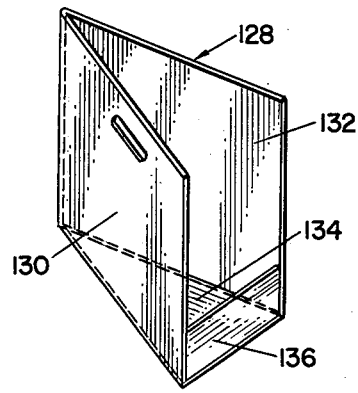
FIG. 7 is a perspective view of a tray comprising a portion of the foam and grease burning apparatus of FIG. 6.

With reference to FIGS. 6 and 7 of the trays 70, 72, and 74 includes two removable ash collectors indicated generally at 126 and 128. As seen in FIG. 7 each of the ash collectors includes front and rear walls 130 and 132, a bottom wall 134 and a low inner side wall 136.

As is best seen in FIG. 6 the ash collectors 126 and 128 are retained on tray 72 by upstanding sheet metal walls 140, 142, and 144.

With continued reference to FIGS. 5 and 6, a firing plate 146 is mounted on tray 72 between the inner side walls 136 of ash collectors 126 and 128.

The operation of the embodiment of FIGS. 3-8 is similar to that of FIGS. 1 and 2 previously described in that aeration air released within the bath causes a flow of surface strata to progress towards an end wall 52 of the sewage treatment tank as is indicated generally by the arrows 67.

The embodiment of FIGS. 3-8 differs, however, from that of FIGS. 1 and 2 in that a relatively small number of burners 76 are mounted along the end wall 52. FIG. 3 illustrates only three burners 76 and their associated tray and collector apparatus, it being understood that any number of such assemblies can be mounted in spaced relationship along end wall 52 of tank 50 without departing from the spirit of the present invention.

With continued reference to the operation of the embodiment of FIGS. 3-8 the previously described action of guides 102 and collector pipe 88 cause the surface strata to converge towards the entrances 100 of the collector pipes 88 whereby the entrained grease and foam moves over the peripheral edges 86 of the trays and into the relatively small concentrated firing zones 78A. Since the axes 150 of the flames from the burners are inclined downwardly and in the direction of the top strata flow it will be noted that the force of the gases being released from the burners 76 will augment rather than oppose movement of the foam and grease towards and into the firing zones.

In view of the above it will be understood that the tray and collector pipe apparatus of FIGS. 3-8 permit the burning of grease and foam with only a relatively few number of burners as compared to the number of burners employed in the embodiment of FIGS. 1 and 2.

Figure 9:
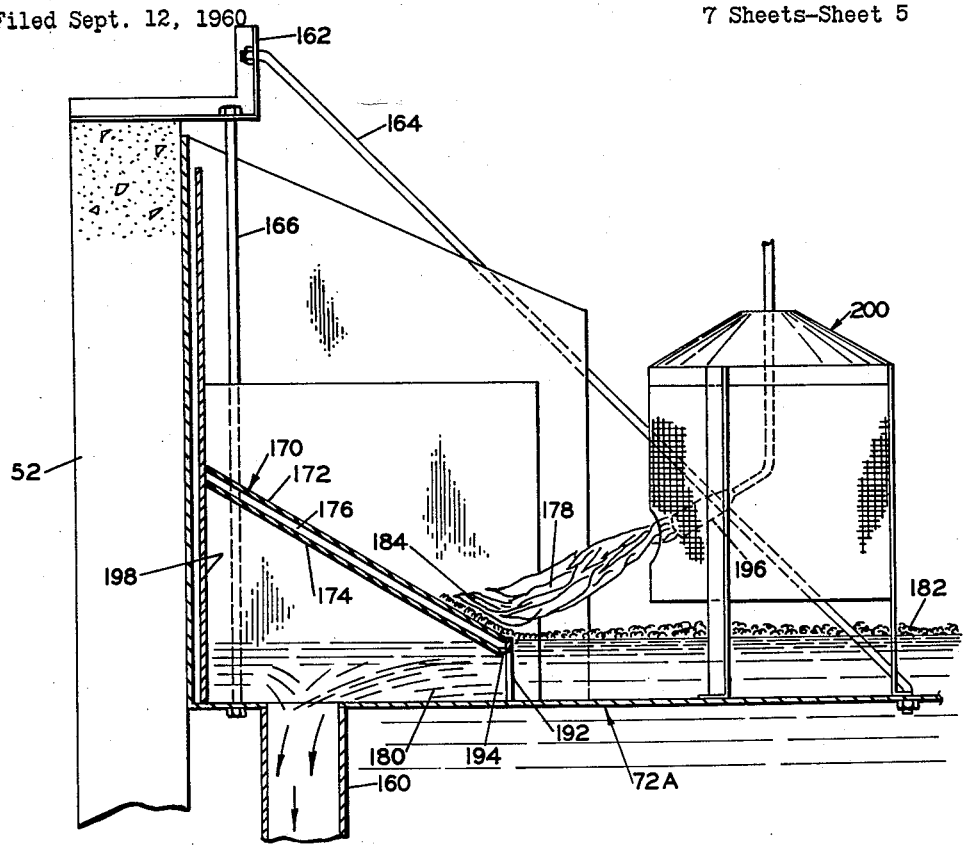
FIG. 9 is a side sectional view of a modified grease burning apparatus constructed in accordance with the present invention, the section being taken along a vertical plane through the center line of the apparatus.
Figure 10:
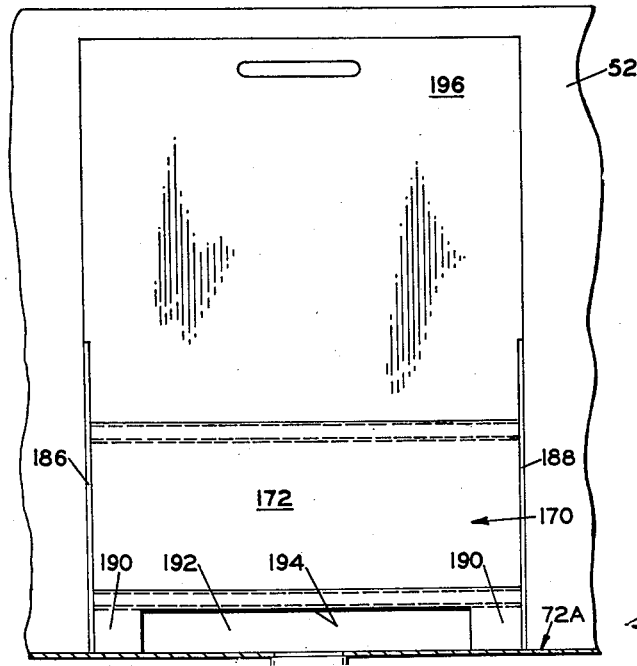
FIG. 10 is a front elevational view of the apparatus of FIG. 9.

Reference is next made to FIGS. 9 and 10 which illustrate a modified apparatus particularly adapted for removing grease from a pre-aeration tank. The apparatus includes a tray means 72A provided with a downwardly extended collector pipe 160 which may be either in the form of a straight walled pipe or a pipe with a converging lower end as shown at 90 in FIG. 5.

The tray is mounted to side wall 52 of a sewage treatment tank by means of a bracket 162 and tie rods 164 and 166. These tie rods are preferably provided with threaded ends or turnbuckles so that the tray can be mounted such that the upper edge is just below the surface level of the bath in tank 50.

With continued reference to FIGS. 9 and 10, the apparatus includes a skimmer and firing plate means indicated generally at 170 which includes a front wall 172 and a lower wall 174 separated by an air space 176. This composite firing plate construction serves to insulate a firing zone 184 developed by a flame 178 from the cooling effects of bath 180 whereby the heat is concentrated and effectively used in burning the grease scum 182 in firing zone 184.

Referring again to FIGS. 9 and 10, the firing plate means 170 includes side walls 186 and 188 and front wall 190, the latter being provided with an opening 192.

The lower edge 194 of firing plate means 170 is disposed just below the surface of bath 180 whereby said lower edge 194 skims the grease scum from the surface of the bath and presents it to firing zone 184 where a flame 178 is directed to the firing zone by a burner 196.

As seen in FIGS. 9 and 10, a collector pipe 160, or a plurality of such collector pipes, are disposed beneath firing plate 170 and within the confines of side walls 186 and 188, back wall 193, and front wall 190 such that collector pipe 160 creates a flow of surface strata through opening 192.

As is best seen in FIG. 9 burner 196 may be covered with a pervious wire foam shield located generally at 200. It has been found that a shield of this type effectively prevents large accumulations of foam from smothering flame 178 when burner 196 is disposed so as to direct its flame inwardly against firing plate means 170.

At this time it should be pointed out that it is normally preferable to burn foam in the aeration tanks instead of the pre-aeration tanks since the detergents in the sewage cause the greatest concentrations of foam in the aeration tank after the detergents have been churned for the period of time it takes the sewage to progress through the pre-aeration tanks and into the aeration tanks.

On certain days, however, when the water table is low and the concentration of the detergents in the sewage is high, large deposits of foam collect on the surfaces of the pre-aeration tanks. At such times it is desirable to use a burner cover as seen at 200 in FIG. 9 to shield the inwardly directed burner 196 from large masses of floating foam.

Figure 11:
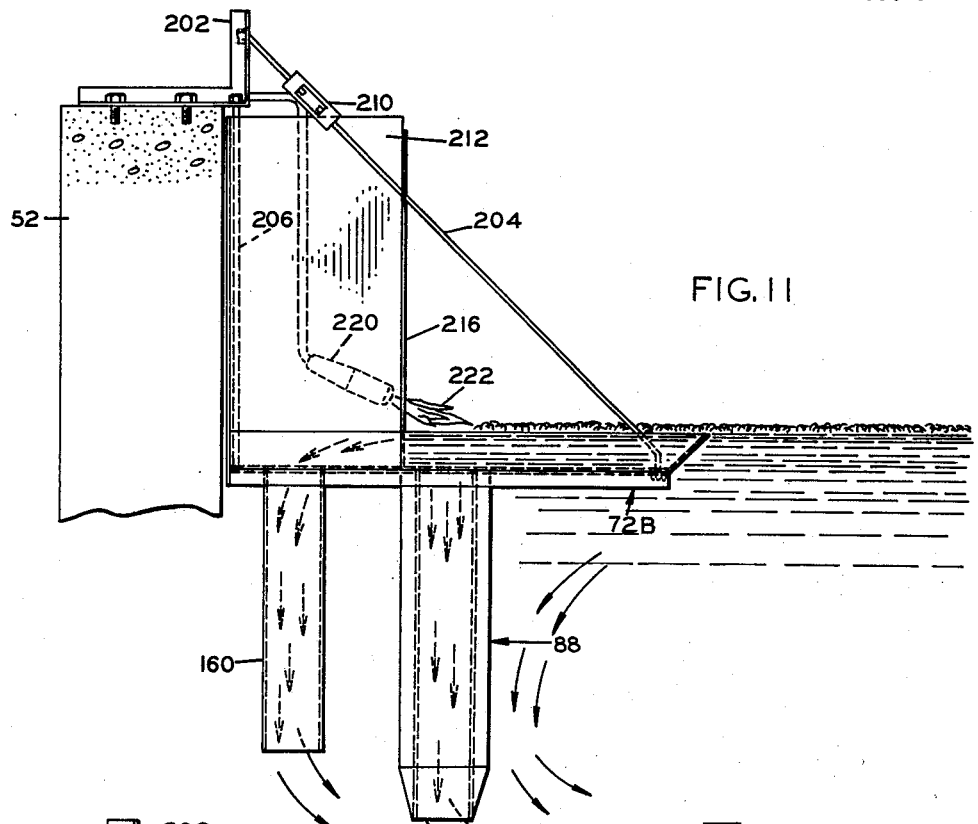
FIG. 11 is a side elevational view of a modified foam burning apparatus constructed in accordance with the present invention.
Figure 12:
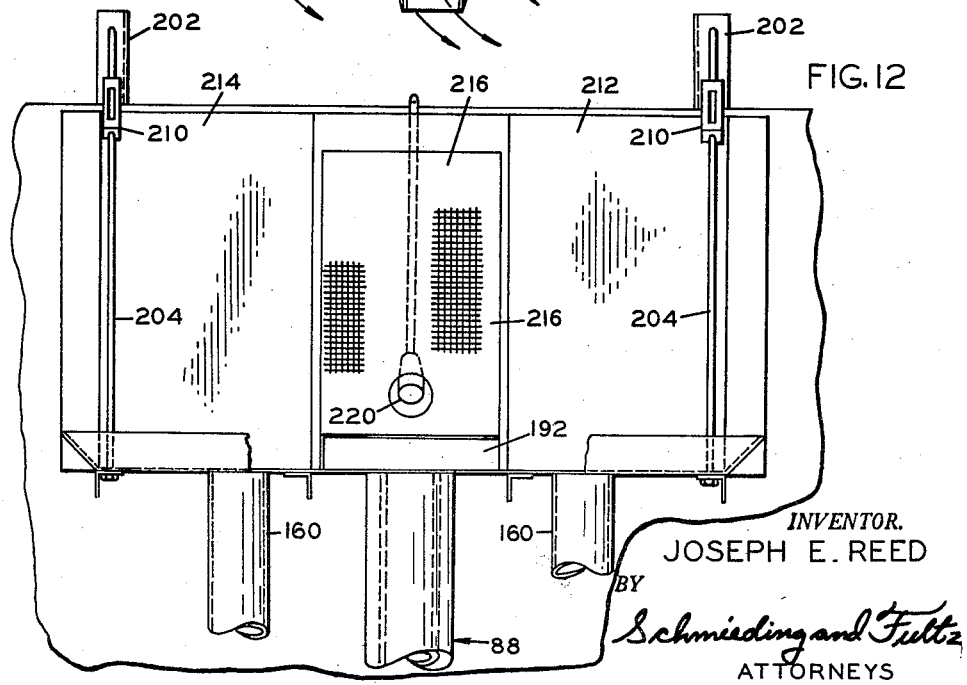
FIG. 12 is a front elevational view of the apparatus of FIG. 11.
Figure 13:
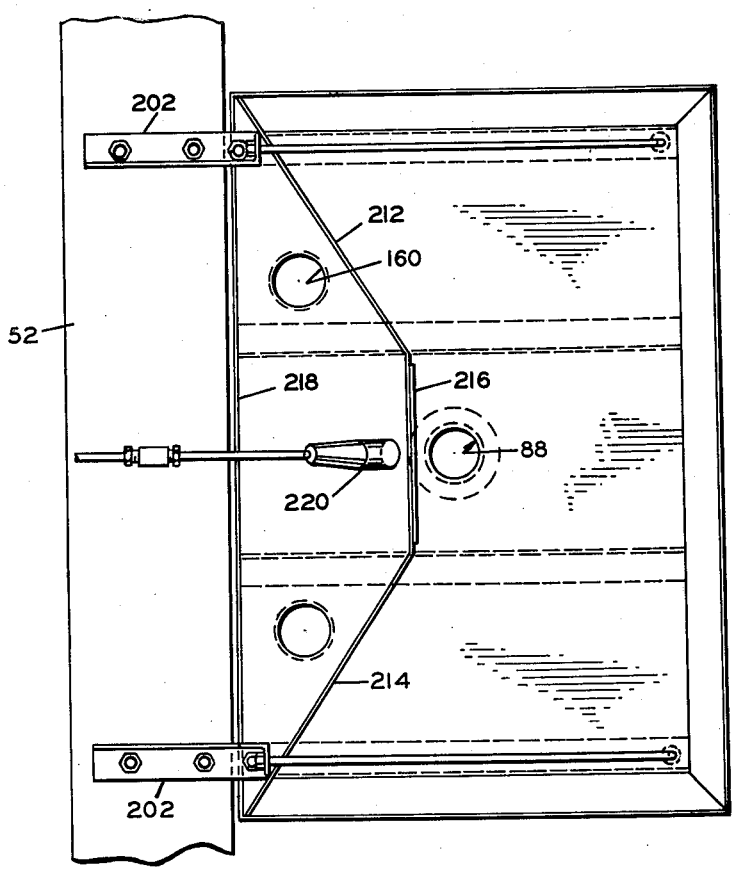
FIG. 13 is a top elevational view of the apparatus of FIGS. 11 and 12.

Reference is next made to FIGS. 11–13 which illustrate another modification of the present invention which is particularly adapted for the burning of large concentrations of foam which occur particularly in aeration tanks after the detergents in the bath which have been churned for the period of time necessary for the sewage to move it through the pre-aeration tanks and into the aeration tanks.

With continued reference to FIGS. 11–13 the foam burning apparatus includes a tray means located generally at 72B that includes a plurality of vertically disposed collector tubes 160 or collector tubes 88 of the type previously described herein.

Tray means 72B is connected to tank wall 52 by means of brackets 202 and supporting rods 204 and 206, the latter being provided with means such as turn buckles 210 for vertically adjusting the tray.

The apparatus of FIGS. 11–13 includes forwardly side walls 212 and 214, a pervious screen front wall 216, and a rear wall 218.

A burner 220 is mounted to the tank wall of apparatus and so arranged to direct a flame 222 outwardly through pervious screen wall 216 and against the layer of foam that is caused to continuously progress inwardly and against flame 222 by the surface flow of current being collected by tube ends 160 and 88.

Figure 14:
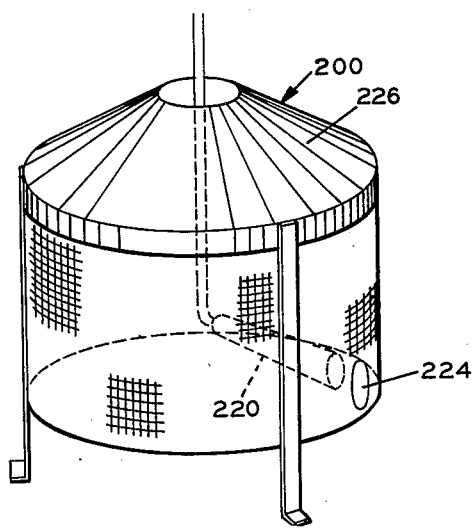
FIG. 14 is a perspective view of a burner shield used in connection with the foam burning apparatus of FIGS. 11–13.

With reference to FIG. 14 a foam shield 200 can be mounted on tray means 72-B, in place of side walls 212 and 214 and pervious screen wall 216, with burner 220 and hole 224 being directed outwardly and in opposition to the direction of movement of the foam in the same manner as is seen in FIG. 11. Foam shield 200 is preferably provided with an impervious waterproof roof 226 which serves to shield burner 220 from the weather.

While the forms of embodiments of the present invention as herein disclosed constitute preferred forms, it is to be understood that other forms might be adopted, all coming within the scope of the claims which follow.

I claim:

1. The steps in the method of treating sewage which method comprises releasing a gaseous flow within a bath of sewage from below the surface thereof whereby combustible substances are caused to rise to the surface of said bath; passing said combustible substances on the surface of said bath to a firing zone on the surface of said bath; and igniting said combustible substances in said firing zone.

2. The steps in the method of treating sewage which method comprises releasing a gaseous flow within a bath of sewage from below the surface thereof whereby combustible substances are caused to rise to the surface of said bath; passing said combustible substances on the surface of said bath to a firing zone on the surface of said bath; and directing a flame against said combustible substances to burn said substances in said firing zone.

3. An apparatus for treating sewage comprising, in combination, tank means for containing a bath of sewage, said tank means including a bath surface level zone; conduit means including an outlet communicating with the interior of said tank means beneath said surface level zone for discharging a flow of gas into said bath to create a surface flow of combustible substances; a firing zone located at said surface level zone of said tank means; and means for igniting said substances in said firing zone.

4. The steps in the method of treating sewage which method comprises releasing a gaseous flow within a bath of sewage from below the surface thereof whereby combustible substances are caused to rise and move along the surface of said bath; producing a zone of low pressure in said bath whereby surface strata and said combustible substances are caused to progress towards a concentrated firing zone on the surface of said bath; and igniting said combustible substances in said firing zone.

5. An apparatus for treating sewage comprising, in combination, tank means for containing a bath of sewage, said tank means including a bath surface level zone; means in said tank means for circulating said bath to create a flow of combustible substances along the surface of said bath; a flow collector pipe disposed in said tank means and including an intake located at said surface level zone; means forming a firing zone at said intake of said flow collector pipe; and means for igniting said substances in said firing zone.

6. An apparatus for treating sewage comprising, in combination, tank means for containing a bath of sewage, said tank means including a bath surface level zone; means in said tank means for circulating said bath to create a flow of combustible substances along the surface of said bath; a flow collector pipe disposed in said tank means and including an intake located at said surface level zone; means forming a firing zone at said intake of said flow collector pipe; means for igniting said substances in said firing zone; and tray means located at said intake of said flow collector pipe.

7. An apparatus for treating sewage comprising, in combination, tank means for containing a bath of sewage, said tank means including a bath surface level zone; conduit means including an outlet communicating with the interior of said tank means beneath said surface level zone for discharging a flow of gas into said bath to create a flow of combustible substances across the surface of said bath; a flow collector pipe disposed in said tank means and including an intake located at said surface level zone; means forming a firing zone at said intake of said flow collector pipe; and means for igniting said substances in said firing zone.

8. An apparatus for treating sewage comprising, in combination, tank means for containing a bath of sewage, said tank means including a bath surface level zone; conduit means including an outlet communicating with the interior of said tank means beneath said surface level zone for discharging a flow of gas into said bath to create a flow of combustible substances across the surface of said tank means; a flow collector pipe disposed in said bath and including an intake located at said surface level zone; means forming a firing zone at said intake of said flow collector pipe; means for igniting said substances in said firing zone; and tray means located at said intake of said flow collector pipe.

9. An apparatus for treating sewage comprising, in combination, tank means for containing a bath of sewage, said tank means including a bath surface level zone, means in said tank means for circulating said bath to create a flow of combustible substances along the surface of said bath; a flow collector pipe disposed in said tank means and including an intake located at said surface level zone; means forming a firing zone at said intake of said flow collector pipe; and a burner for directing a flame in the direction of said flow and towards said firing zone.

10. An apparatus for treating sewage comprising, in combination, tank means for containing a bath of sewage, said tank means including a bath surface level zone; means in said tank means for circulating said bath to create a flow of combustible substances along the surface of said bath; a tray horizontally disposed at said surface level zone, said tray including a hole; a flow collector pipe extending downwardly into said tank means and including an intake communicating with said hole in said tray and an outlet disposed below said surface level zone; and means for igniting said substances in a firing zone at said intake of said flow collector pipe.

11. The apparatus defined in claim 10 wherein said means for igniting said substances is provided by a burner that directs a flame in the direction of said flow and towards said firing zone.

12. The apparatus defined in claim 10 that includes means for vertically adjusting said tray relative to said surface level zone.

13. The apparatus defined in claim 10 that includes a flow guide extending outwardly from said tray at said surface level zone.

14. An apparatus for treating sewage comprising, in combination, tank means for containing a bath of sewage, said tank means including a bath surface level zone; means in said tank means for circulating said bath to create a flow of combustible substances along the surface of said bath; tray means at said surface level zone; firing plate means overlying said tray means; and burner means for directing a flame against said firing plate means.

15. The apparatus defined in claim 14 wherein said firing plate means includes a plurality of plates separated by an insulating space.

16. The apparatus defined in claim 14 wherein said firing plate means includes a lower edge at said surface level zone for skimming the surface of said bath.

17. The apparatus defined in claim 14 wherein said tray means includes a flow collector means located downstream of said firing plate means.

18. An apparatus for treating sewage comprising, in combination, tank means for containing a bath of sewage, said tank means including a bath surface level zone; means in said tank means for circulating said bath to create a flow of combustible substances along the surface of said bath; a tray horizontally disposed at said surface level zone; flow collector means at said tray means; and burner means located above said tray means and positioned to direct a flame upstream of said flow collecting means and above the surface of said bath.

19. An apparatus for treating sewage comprising, in combination, tank means for containing a bath of sewage, said tank means including a bath surface level zone; means in said tank means for circulating said bath to create a flow of combustible substances along the surface of said bath; a tray horizontally disposed at said surface level zone; flow collector means at said tray means; burner means located above said tray means and positioned to direct a flame upstream of said flow collecting means and above the surface of said bath; and wall means surrounding said burner, certain of said wall means being pervious to said flame.

References Cited in the file of this patent

UNITED STATES PATENTS

| | | |
|---|---|---|
| 370,883 | Moore | Oct. 4, 1887 |
| 1,160,360 | Atterbury et al. | Nov. 16, 1915 |
| 1,703,041 | Imhoff | Feb. 19, 1929 |
| 2,015,050 | Baird et al. | Sept. 17, 1935 |
| 2,230,385 | Pecker | Feb. 4, 1941 |
| 2,287,427 | Hawley | June 23, 1942 |
| 2,330,805 | Batcheler et al. | Oct. 5, 1943 |
| 2,882,841 | Ferriss et al. | Apr. 21, 1959 |